United States Patent [19]
Smith

[11] Patent Number: 5,954,479
[45] Date of Patent: Sep. 21, 1999

[54] TWIN ENGINE, COAXIAL, DUAL-PROPELLER PROPULSION SYSTEM

[76] Inventor: Ronald A. Smith, 2025 N. Ventura Ave., Ventura, Calif. 93001

[21] Appl. No.: 08/980,482

[22] Filed: Nov. 29, 1997

Related U.S. Application Data

[60] Provisional application No. 60/033,378, Dec. 16, 1996.

[51] Int. Cl.$^6$ .............................. B63H 5/10; B64C 11/48; A47C 7/74
[52] U.S. Cl. ..................... 416/125; 416/129; 416/157 B; 416/170 R
[58] Field of Search ................................... 416/125, 129, 416/130, 157 B, 170 R

[56] References Cited

U.S. PATENT DOCUMENTS

| | | |
|---|---|---|
| 1,147,083 | 7/1915 | Gibson . |
| 1,902,374 | 3/1933 | Pirinoli . |
| 2,367,230 | 1/1945 | McCoy . |
| 2,440,046 | 4/1948 | Hautier . |
| 2,470,560 | 5/1949 | Hoover . |
| 2,525,708 | 10/1950 | Morris . |
| 2,619,182 | 11/1952 | Martin . |
| 2,698,147 | 12/1954 | Hovgard . |
| 2,761,517 | 9/1956 | Detamore et al. . |
| 2,804,154 | 8/1957 | Treseder et al. . |
| 3,173,343 | 3/1965 | Berry . |
| 3,395,762 | 8/1968 | Itazawa . |
| 3,873,236 | 3/1975 | Gall . |
| 4,362,467 | 12/1982 | Elliott . |
| 4,426,049 | 1/1984 | Stewart ............................... 416/125 X |
| 4,486,176 | 12/1984 | Campion . |
| 4,563,129 | 1/1986 | Pagluica .......................... 416/170 R X |
| 4,591,313 | 5/1986 | Miyatake et al. . |
| 4,599,043 | 7/1986 | Müller . |
| 4,657,484 | 4/1987 | Wakeman et al. . |
| 4,676,459 | 6/1987 | Seefluth ............................. 416/125 X |
| 4,688,995 | 8/1987 | Wright et al. . |
| 4,728,261 | 3/1988 | Wright et al. . |
| 4,772,181 | 9/1988 | Poucher ............................. 416/130 X |
| 4,829,850 | 5/1989 | Soloy . |
| 4,842,484 | 6/1989 | Johnson ............................. 416/129 X |
| 4,955,561 | 9/1990 | Seefluth ............................. 416/125 X |
| 5,441,388 | 8/1995 | Berger .................................... 416/125 |

FOREIGN PATENT DOCUMENTS

| | | | |
|---|---|---|---|
| 844172 | 7/1939 | France ................................... 416/125 |
| 334519 | 9/1917 | Germany ............................... 416/125 |
| 109145 | 11/1943 | Sweden ............................. 416/157 B |
| 591492 | 8/1947 | United Kingdom .................. 416/125 |
| 707814 | 4/1954 | United Kingdom .............. 416/157 B |

OTHER PUBLICATIONS

Ventura Modifications Corporation, Centerline Twin–Pac, Business Plan, Prior to Dec. 16, 1995, 46 pages.

*Primary Examiner*—John E. Ryznic
*Attorney, Agent, or Firm*—Richard T. Lyon

[57] ABSTRACT

A twin engine, coaxial, dual-propeller propulsion system employing a unique transmission having two independent drive trains. The first of the two engines exclusively drives a first drive train, which in turn rotates a forward multi-bladed propeller assembly. The second engine exclusively drives a second drive train, which in turn rotates an aft multi-bladed propeller assembly. Thus, the propellers of this propulsion system, even though coaxial, are driven by separate engines. The propulsion system also enjoys the increased propulsive efficiency of a coaxial dual-propeller design as the first drive train rotates the forward propeller assembly in a first rotational direction and the second drive train rotates the aft propeller assembly in the opposite direction. Further, the propulsion system employs pitch change control mechanisms which independently control the respective pitch of the blades of the two propeller assemblies. Specifically, a first pitch change controller exclusively controls the pitch of the blades of the forward propeller assembly and a second pitch change controller exclusively controls the pitch of the blades of the aft propeller assembly.

8 Claims, 3 Drawing Sheets

TWIN ENGINE, COAXIAL, DUAL-PROPELLER PROPULSION SYSTEM

CROSS-REFERENCES

The present application derives from provisional application Ser. No. 60/033,378 filed Dec. 16, 1996 and entitled "Duel Engine and Coaxial Propeller Transmission". This provisional application is incorporated herein by this reference.

BACKGROUND

2. Technical Field

This invention relates to a propulsion system for a vehicle or machine such as an aircraft, boat, wind generator, and the like, characterized by two engines that drive two coaxial propellers, props or fans, and particularly to such a system employing a transmission that allows each of the propellers, props, or fans to be exclusively driven by a separate one of the engines.

3. Background Art

Twin engine aircraft provide many advantages over single engine aircraft. First, the use of two engines can increase the overall power of the aircraft, allowing for higher thrust levels and faster air speeds. Next, two engines provide a redundancy that enhances the safety of the aircraft. Should one of the two engines fail, the remaining engine is typically sufficient to fly the plane and land safely. For these reasons, aircraft used for carrying passengers for hire must under certain conditions have at least two engines.

Most current twin engine propeller driven airplanes mount an engine on each wing. However, wing mounted engines reduce aerodynamic efficiency. They also require complex structures and expensive duplicate installations of components and systems. Wing-mounted engines further produce dangerous control problems resulting from sudden asymmetrical thrust should one of the engines fail.

One solution to the problems presented by mounting the engines on the wings of a twin engine aircraft has been to power a single propeller with both engines. This single propeller unit is typically mounted on the nose of the airplane with both engines arranged in a side-by-side configuration just behind the propeller unit. Most of these twin-engine, single propeller propulsion systems were design so that in the event of a failure of one of the engines, the remaining engine could still power the propeller, albeit at reduced power. Thus, the twin-engine, single propeller system retains the aforementioned advantages of a twin engine aircraft, namely increased power and safety, while eliminating the disadvantages associated with the wing-mounted twin engine configuration. However, such systems do not realize the benefits associated with a so-called coaxial, dual-propeller design.

Current coaxial, dual-propeller modules typically employ a single engine to power two coaxial, counter-rotating propellers. Although, at least one system has been proposed where two engines are used to drive a single mechanism that, in turn, drives both propellers. Such systems are advantageous because they are capable of providing an enhanced thrust efficiency. A modern multi-blade propeller creates considerable thrust used to propel the airplane through the air. However, a substantial component of swirl is also imparted to the slipstream generated by the propeller. This swirl component degrades the propulsive efficiency of the propeller. To counteract the swirl component and increase the efficiency of the propulsion system, a second, coaxial propeller is positioned just behind the first. This rear propeller rotates in the opposite direction as the forward propeller, thereby imparting a component of swirl to the slipstream coming from the forward propeller that has the opposite sense from the swirl component created by the forward propeller. The result is a net swirl component that is nil or relatively small. Consequently, the propulsive efficiency is increased. Studies have shown the increased propulsive efficiency to be on the order of nine (9) percent. This represents a significant increase in power and speed capabilities of the aircraft, as well as an opportunity for significant fuel savings.

However, single engine, coaxial, dual-propeller propulsion systems have the inherent disadvantage of all single engine designs. Namely, if the engine fails both propellers are rendered useless. Further, even with the twin engine system mentioned above, the propellers would stop should the single mechanism used to rotate both propellers fail.

Current single-engine, coaxial, dual-propeller propulsion systems are not simple devices, either. Complex gearing arrangements are needed to drive the propellers in opposite directions. In addition, it is desirable that the pitch of the blades on each propeller be independently controllable. Typically, all the blades of each propeller are independently capable of being rotated in unison from a full reverse thrust position which provides maximum thrust, to a so-called feathered position wherein relatively little on no reverse thrust is produced but drag is minimized and turning of the engine (i.e. windmilling") by the propeller during flight is prevented. Pitch positions in-between full reverse thrust and feathered allow the thrust and speed of the aircraft to be regulated while maintaining a constant engine or propeller speed. It is noted that the pitch of the rear propeller is reversed from that of the forward propeller so that it produces a rearward directed thrust like the forward propeller even though it is rotating in the opposite direction. It may also be advantageous to reverse the pitch of the respective propellers so as to produce a forward thrust. This allows the propellers to be used as a brake, both during flight and upon landing, as well as to assist in maneuvering the aircraft while on the ground. Independent control of the blade pitch of each propeller allows the pitch of the rear propeller to be adjusted to compensate for the effect of the slipstream from the forward propeller so that the rear propeller can operate in that slipstream efficiently and contribute to the overall thrust produced by the system. However, independent pitch control for each propeller further complicates the design of current single-engine, coaxial, dual-propeller systems.

Accordingly, there is a need for a propulsion system for a propeller-driven aircraft which enjoys all the benefits of a single-propeller, twin engine design but which also provides the enhance propulsive efficiency available with a coaxial dual-propeller system and which is not susceptible to failure should any single mechanism that rotates the propeller(s) fail. In addition, such a new system would preferably provide independent control of blade pitch of each of the coaxial propellers without the complexity of current systems.

In addition to propeller driven aircraft, the above described systems are also sometimes advantageously employed to drive the props of various watercraft varying from large sea-going vessels and submarines to small recreational power boats. These systems can also be employed to drive the fans of a wind generator such as used in wind tunnels. The same need exists for a twin-engine, coaxial, dual-propeller propulsion design with simplified pitch control and no single-component failure mechanism in these applications as well. Therefore, even though the description of the apparatuses embodying the present invention which follow are directed at a propeller-driven aircraft, it is understood that they are equally applicable to prop-driven watercraft and the fans of wind generating equipment as well.

SUMMARY

The above-described objectives are realized with embodiments of the present invention directed to a twin engine, coaxial, dual-propeller propulsion system employing a unique transmission having two independent drive trains. Specifically, the first of the two engines exclusively drives a first drive train, which in turn rotates a forward multi-bladed propeller assembly. The second engine exclusively drives a second drive train, which in turn rotates an aft multi-bladed propeller assembly. Thus, the propellers of this propulsion system, even though coaxial, are driven by separate engines. This new propulsion system enjoys all the advantages of a twin engine design, namely enhanced power and the safety of a redundant engine. For example, since the drive trains are isolated from each other and operate independently, the failure of one engine or its associated drive train/propeller assembly has no effect on the other propeller assembly. This allows the aircraft to continue flying and land safely. Further, one of the engines could be shut down purposefully at certain times, such as to save fuel during flight, but brought online for takeoff and landing where the need for added power and safety is more critical.

The proposed propulsion system embodying the present invention also enjoys the benefits of a coaxial, counter-rotating, dual-propeller design. The first drive train rotates the forward propeller assembly in a first rotational direction and the second drive train rotates the aft propeller assembly in the opposite direction. As discussed previously, such a counter-rotating propeller configuration can be used to increase the propulsive efficiency of the system.

Further, the proposed propulsion system employs pitch change control mechanisms which independently control the respective pitch of the blades of the two propeller assemblies. Specifically, a first pitch change controller exclusively controls the pitch of the blades of the forward propeller assembly and a second pitch change controller exclusively controls the pitch of the blades of the aft propeller assembly. The independent nature of the two drive trains employed in the present invention provides the opportunity to simplify the pitch change control mechanisms since they both do not have to operate off of a single engine or a single combined input from multiple engines. The pitch change mechanisms, being independent and driven by separate engines and drive trains, are also more reliable than many currently existing previous pitch change devices because a failure of one engine/drive train/propeller assembly will have no effect on the ability to control the pitch of the blades of the still operating propeller assembly. For example, in the preferred embodiment of the present invention, the pitch change control mechanism associated with the aft propeller assembly is a hydraulic system that can be operated using the oil pump and related hardware already existent in the engine that drives the aft propeller. Any failure of the other engine, its associated drive train, pitch change controller, or the forward propeller assembly will have no impact whatsoever on the corresponding systems associated with the aft propeller assembly, or the ability to control the pitch of the aft propeller blades.

In addition to the just described benefits, other objectives and advantages of the present invention will become apparent from the detailed description which follows hereinafter when taken in conjunction with the drawing figures which accompany it.

DESCRIPTION OF THE DRAWINGS

The specific features, aspects, and advantages of the present invention will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

Figure 1:
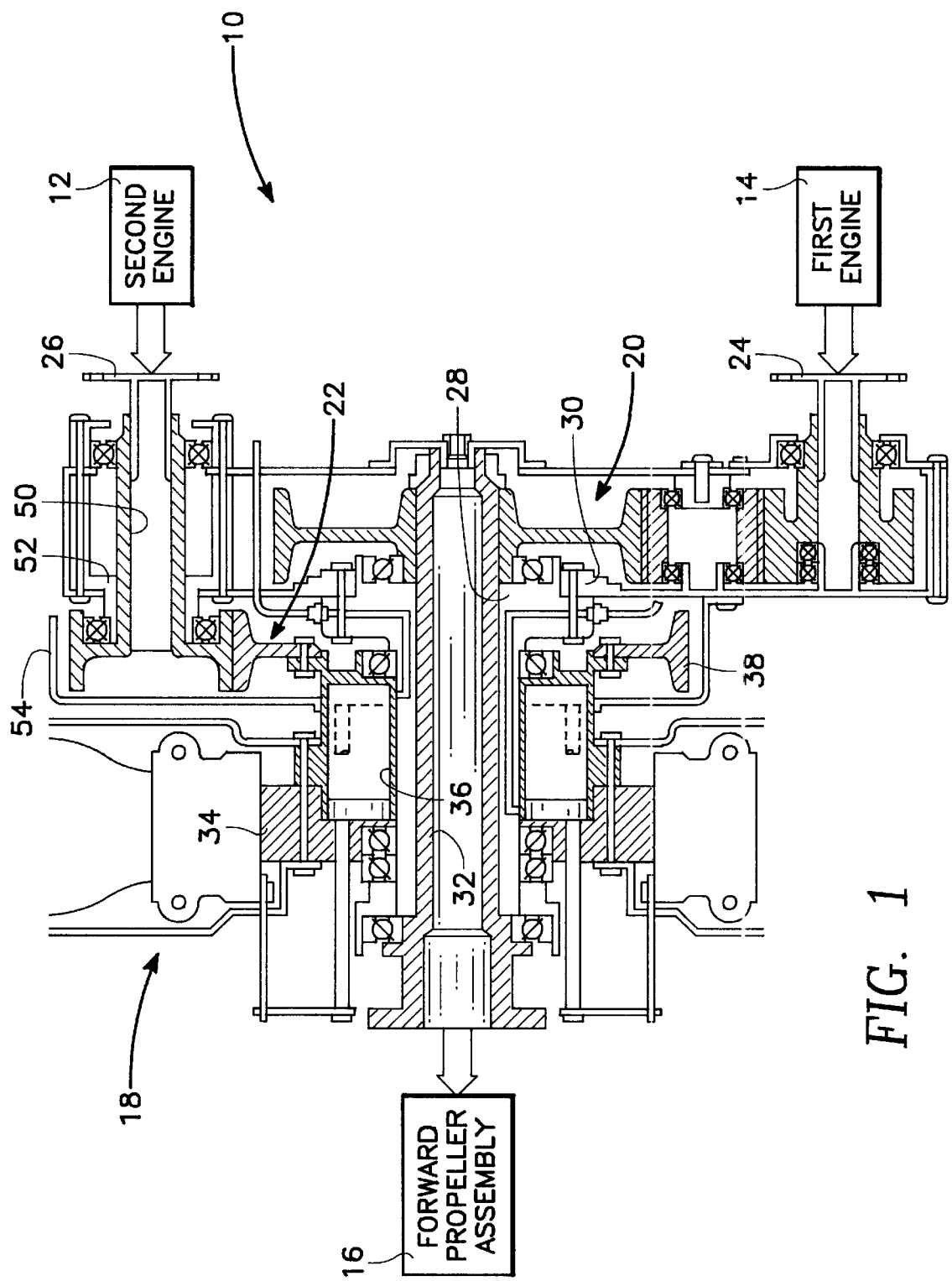
FIG. 1 is an axial cross-sectional view of a propeller transmission embodying the present invention.
Figure 2:
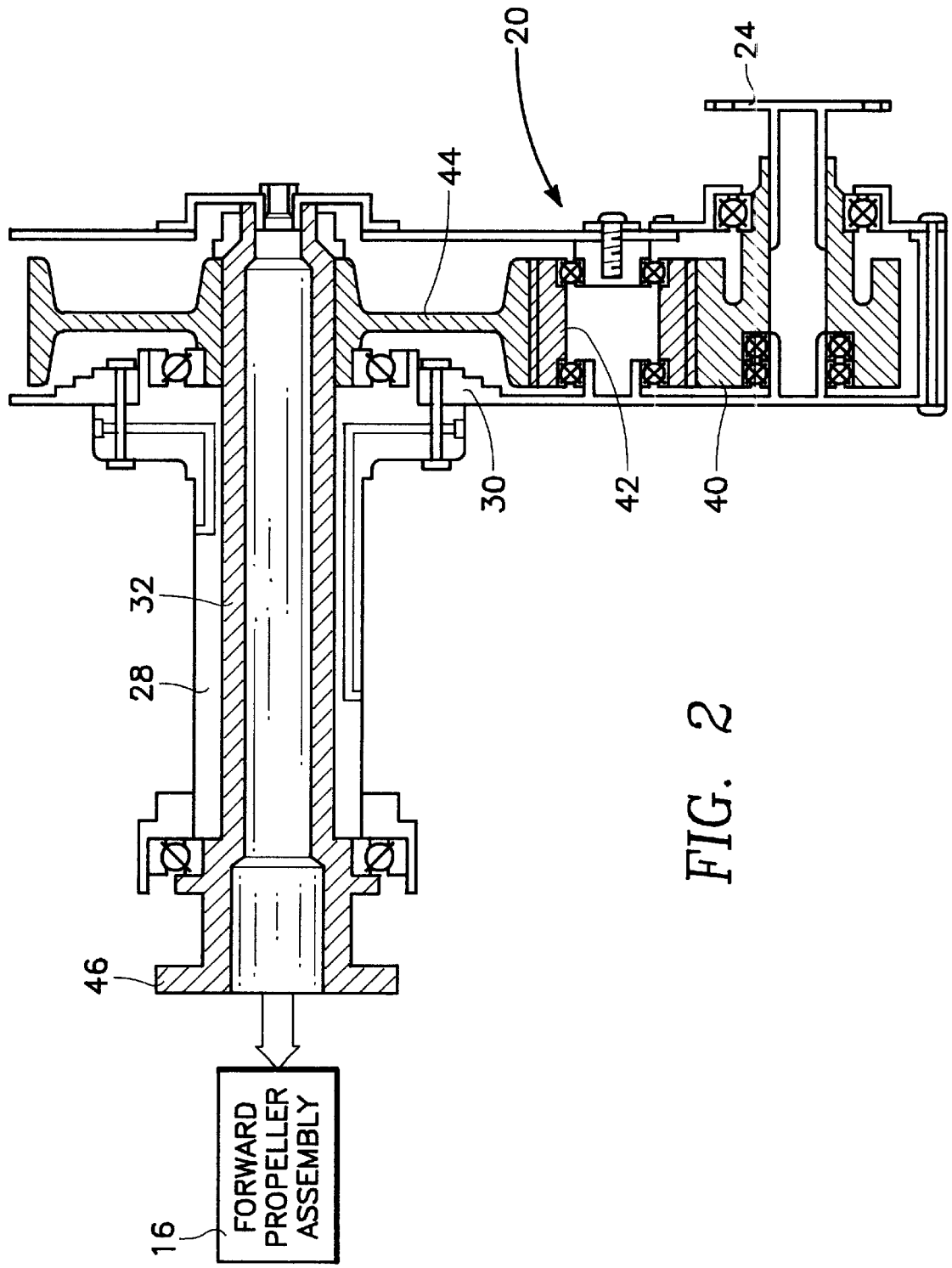
FIG. 2 is a partial, axial, cross-sectional view of the transmission of FIG. 1 showing just the first drive train portion which drives the forward propeller assembly.
Figure 3:
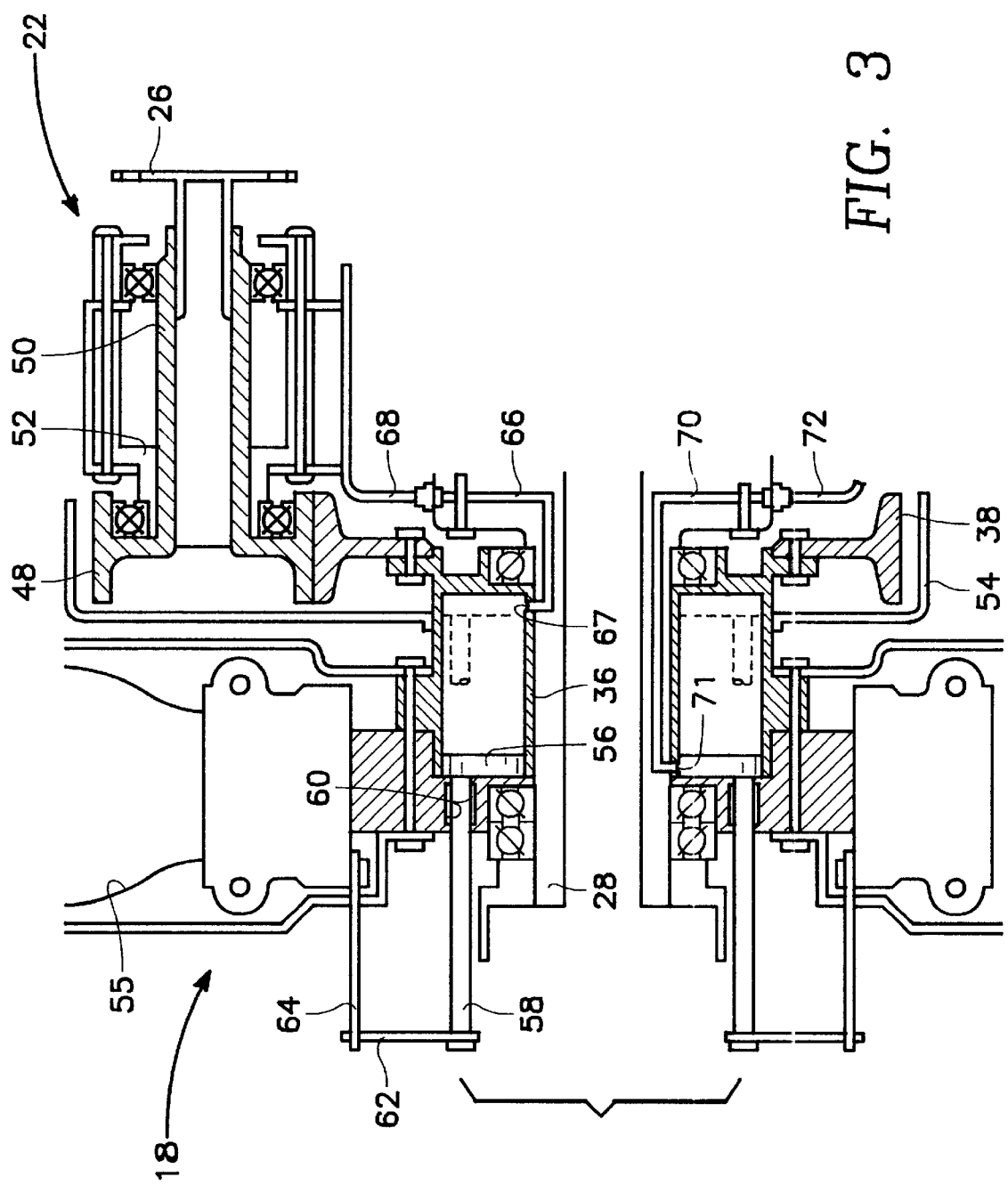
FIG. 3 is a partial, axial, cross-sectional view of the transmission of FIG. 1 showing just the second drive train portion which drives the aft propeller assembly.

FIG. 1 depicts the preferred embodiment of a twin engine, coaxial, dual-propeller propulsion system according to the present invention. This system employs a unique and advantageous transmission 10 that converts the rotational input of each engine 12, 14 respectively, into rotation of a pair of coaxial, counter-rotating propeller assemblies 16, 18. The transmission 10 features separate drive trains 20, 22 (as best shown in FIGS. 2 and 3, respectively) connecting each engine 12, 14 to its associated propeller assembly 16, 18. These drive trains 20, 22 are isolated from each other and operate independently. Therefore, a failure of the engine associated with one drive train, or a component of the drive train or its propeller assembly, has no effect on the operation of the other propeller assembly. In this way the desired redundancy and safety of a twin engine design is realized. As discussed previously, if one of the two engines, or its associated drive train or propeller assembly should fail, the remaining engine and associated propulsion components will allow the aircraft to continue flying and land safely. Specifically, the preferred transmission 10 as shown in FIG. 1 includes a pair of engine input shafts 24, 26 that drive respective gear trains. A tubular support 28 extends from a primary transmission case 30. The support 28 and primary transmission case 30 are stationary and do not rotate. The tubular support 28 separates a propeller shaft 32 associated with the forward propeller assembly 16, from a propeller support assembly associated with the aft propeller assembly 18. The propeller support assembly comprises a hub 34 of the aft propeller assembly 18, an annular cylinder housing 36 and an output gear 38.

Referring to FIG. 2, it is shown that the drive train 20 associated with the forward propeller assembly 16 is made up of a drive shaft 24 that is connected to and drives a pinion gear 40. The pinion gear 40, in turn, drives an idler gear 42, which drives an output gear 44. The inner hub of the output gear 44 is fixedly attached to and concentric with the aft end of the propeller shaft 32. The gears 40, 42, 44 making up the drive train 20 are sealed from the outside environment within the primary transmission case 30. In addition, the drive shaft 24, with the exception of its front end, is similarly sealed within the case 30 and tubular support 28 that connects to and opens up into the case 30. Each gear 40, 42, 44, as well as the drive shaft 24, are rotatably supported in the case 30 and support 28 by various appropriately sized, conventional bearings. The gears 40, 42, 44, drive shaft 24, and associated bearings are lubricated via a conventional lubrication system (not shown), as is typical in the art.

The front end of the propeller shaft 32 terminates in a standard propeller flange 46 that connects to the forward propeller assembly 16. The forward propeller assembly is of any appropriate conventional type, such as those typically employed with a single engine, single propeller class of aircraft. This forward propeller assembly 16 preferably employs a conventional blade pitch control mechanism (not shown) that can be controlled via a hydraulic fluid apparatus or via a conventional mechanical device, either of which can be disposed within the hollow center of the propeller shaft 32. Preferably, the blade pitch control device employed is of a type that allows the pitch to be adjusted either while the propeller is stationary, or while rotating. As the above-described forward propeller assembly 16 and its associated blade pitch control devices are conventional and well known, no further details concerning their construction will be provided herein.

FIG. 3 shows the drive train 22 associated with the aft propeller assembly 18. This drive train 22 is made up of a drive shaft 26 that is connected to and drives a pinion gear 48. The pinion gear 48 has a tubular extension 50 projecting aftwards from its hub. It is this extension 50 that interfaces with the drive shaft 26. The tubular extension 50 is supported within a stationary, sealed housing 52 that is attached to the right-side end of the primary transmission housing 30 (as best seen in FIG. 1). In the preferred embodiment shown in FIGS. 1 and 3, the extension 50 is supported within the housing 52 at the aft end by an appropriately sized bearing and at its forward end by cylindrical extension of the housing itself. Referring once again to FIG. 3, the pinion gear 48 drives the output gear 38. The hub of the output gear 38 is fixedly attached to and concentric with the aft end of the annular cylinder housing 36. The opening defined by this hub is large enough such that no part of the output gear 38 interferes with the annular housing's central, cylindrical channel. The gears 38, 48 making up the drive train 22, as well as the aft end of the housing 36 are sealed from the outside environment within a secondary transmission case 54. The secondary transmission case 54 is attached to the front end of the primary transmission case 30, and like the primary case, does not rotate. The pinion gear 48 is rotatably supported in the secondary transmission case 54 by appropriately sized, conventional bearing attached to the exterior surface of the aforementioned cylindrical forward end of the housing 52 that extends into the secondary case 54. In addition, the annular cylinder housing and attached output gear 38 are rotatably supported around the outside surface of the stationary tubular support 28 via appropriately sized bearings. The gears 38, 48 and associated bearings are lubricated via a conventional lubrication system (not shown), as is typical in the art.

FIG. 3 also depicts a unique, uncomplicated control apparatus used to control the pitch of the blades 55 of the aft propeller assembly 18. This control apparatus is completely independent from the apparatus employed to control the blade pitch of the forward propeller. Thus, the blade pitch of the two propellers can be adjusted differently to maximize thrust, minimize the swirl component of the slipstream, or create other beneficial effects. The blade pitch control apparatus of the aft propeller assembly preferably includes an annular piston 56 located in the interior cavity of the annular cylinder housing 36. This piston 56 is shown in FIGS. 1 and 3 in its fully forward position using solid lines and in its fully aft position using dashed lines. Hydraulic pressure is used to move the piston 56 in the forward or aftward direction and to hold the piston in place once the desired position is reached. A plurality of connecting rods 58 extend from the front face of the annular piston 56, through the aft propeller assembly hub 34 that forms the front wall of the aforementioned piston cavity, and beyond to a point between the forward and aft propeller assemblies. In the preferred embodiment shown in FIG. 3, the rods 58 pass through a chamber 60 formed within the hub 34. This chamber 60 acts to support the rods 58 and seal the piston cavity from the outside environment. Preferably, there is one connecting rod 58 for each blade 55 of the aft propeller assembly 18 and each extends from a point on the annular cylinder housing 36 that is close to its associated blade. The connecting rods 58 are attached at their respective distal ends to an annular collector ring 62 near the ring's inner edge. A plurality of driving links 64, one for each blade 55 of the aft propeller assembly 18, extend between the outer edge of the collector ring 62 to connection point on the inner end of the associated propeller blade. In operation, when the annular piston 56 is moved forward or aft, it moves the connecting rods 58. The connecting rods 58, in turn, move the collector ring 62, which actuates the driving links 64. The driving links 64 are connected to the inner end of each blade 55 at a point offset from the center of its rotation in the longitudinal (i.e. pitch) direction. Thus, when the piston 56 is moved, the blades 55 rotate in unison, thereby changing the pitch of the aft propeller assembly 18.

The hydraulic pressure used to move the annular piston 56 is produced by a hydraulic fluid feed circuit. This circuit includes aft hydraulic porting 66 that originates adjacent a groove 67 formed all the way around the cylindrical inner wall of the annular cylinder housing 36 near the aft end of the interior cavity. The porting 66 extends through the stationary tubular support 28 to a terminus on its right side where it is connected to a conventional hydraulic line 68. The housing 36 has at least one, but preferably many approximately equally spaced openings, connecting the bottom of the groove 67 to the housing's interior cavity at its extreme aft end behind the annular piston 56. If desired the aforementioned opening can be replaced with a continuous or nearly continuous slot. The hydraulic circuit also includes forward hydraulic porting 70 that originates adjacent a groove 71 formed all the way around the cylindrical inner wall of the annular cylinder housing near the front end of the interior cavity. The porting 70 extends through the stationary tubular support 28 to a terminus on its left side where it is connected to a conventional hydraulic line 72. Here, the housing 36 has at least one, but preferably many approximately equally spaced openings (or if desired a continuous or nearly continuous slot), connecting the bottom of the groove 71 to the housing's interior cavity at its extreme forward end in front of the annular piston 56. The hydraulic lines 68, 72 preferably are routed to a position behind the transmission where they are connected to a hydraulic circuit pump (not shown) and related devices found in such hydraulic circuits typical of the art. In one preferred embodiment of the present invention, the hydraulic circuit pump and related devices comprise the oil lubrication system of the engine driving the aft propeller assembly 18. This reduces the hardware needed to control the pitch of the aft propeller blades and simplifies the overall propulsion system.

The hydraulic circuit operates by pumping hydraulic fluid either into the aft end or the forward end of the interior cavity of the cylinder housing 36. In the case where hydraulic fluid is pumped into the aft end of the cavity behind the piston 56, the piston is pushed forward and excess fluid in front of the piston is forced out of the cavity. Whereas, in the case where fluid is pumped into the forward end of the cavity in front of the piston, the piston is pushed in backward and excess fluid in the aft end of the cavity is forced out of the cavity. When the piston 56 is in position, i.e. the position that results in the desired blade pitch for the aft propeller assembly 18, hydraulic fluid pumping ceases and the fluid on both sides of the piston hold it in place, thereby preserving the desired pitch of the propeller blades 55. It is noted that the just described propeller blade pitch control apparatus is capable of adjusting the pitch either while the aft propeller assembly is stationary, or while rotating. Further, it is preferred that the length of the annular cylinder housing cavity, as well as that of the connecting rods 58 and driving links 64, are sufficient to set the pitch of the propeller blades 55 within a range from at least a full reverse thrust position to a full feathered position, and if desired beyond the full feathered position to a full forward thrust position.

The above-described propeller transmission can be connected to any type of power plant that provides rotary torque. For example, in the context of an aircraft, a gas turbine or reciprocating type engine may be employed. In the context of a watercraft, wind generator, or other related device, the power plant might be electric, steam or hydraulic powered. The power plant could even be a windmill or water wheel in the appropriate application. Essentially, the transmission is very versatile as to the type of power plant that can be used as an input. In addition, it is not necessary that the same type of power plant be used for each input. The individual power plants could be of different sizes or type, and could be operated at different power levels and speeds, if desired. All this is possible because the drive trains connected to each propeller are completely independent from one another. Being able to vary the types and characteristics of the power plant inputs to the propeller transmission allows great latitude in tailoring them to the specific application.

The above-described propeller transmission can also be operated with one or both of the engines running because of the independent nature of the drive trains powering the propeller assemblies. This would, for instance, allow an aircraft to have a main engine which is designed to operate continuously during flight, while a second engine would act as a backup for safety during takeoff and landing, or for use in the event of a main engine failure.

The propeller transmission, engines, and propeller assemblies making up the twin engine, coaxial, dual-propeller propulsion system embodying the present invention can be combined in a pod that is mountable as a unit to the airframe of an aircraft, for example on the front of the aircraft to form its nose. Such a pod configuration facilitates the conversion of existing single engine aircraft to one employing an embodiment of the present invention. Such mounting schemes are known in the art. For example, these types of mounting schemes are used to mount the previously-describe dual engine, single propeller propulsion systems to the front of an aircraft. As these mounting schemes are known, no further detail will be provided herein.

Reference was made throughout the foregoing descriptions to the right side or left side of the transmission. However, it is understood that the components of the transmission could be reversed such that those components referred to or depicted as being on the right side would be on the left and those components referred to or depicted as being on the left side would be on the right. The transmission could also be rotated 90 degrees so as to be employed with a propulsion system having an upper and lower stacked engine arrangement. It is believed such a configuration would be useful for retrofitting certain existing aircraft having extremely deep but somewhat narrow engine pods. Still further, since the power plants driving the transmission are completely separate, the engines could be staggered longitudinally within the aircraft wherein an extended drive shaft is employed to connect the more distant engine to the transmission. This longitudinally staggered arrangement can be useful in controlling the location of the aircraft's center of gravity. Of course, any of the foregoing alternate engine and transmission configurations could be adapted for use in watercraft and wind generator applications.

While the invention has been described in detail by reference to the preferred embodiment described above, it is understood that variations and modifications thereof may be made without departing from the true spirit and scope of the invention. For example, although the present invention has been described in connection with embodiments that are affixed to the front of an aircraft, the bearing arrangement of the propeller transmission permits thrust to be absorbed in a forward or reverse direction. Therefore, in reference to aircraft design, embodiments of the present invention could also be mounted at the tail in a so-called pusher configuration. This alternate arrangement would be particularly advantageous for use in watercraft employing rear mounted props.

Additionally, in regards to the annular cylinder housing and piston arrangement described above, an alternate embodiment is possible wherein the connecting rods, collector ring and driving links are driven by a plurality of individual cylinders and pistons rather than by a single annular housing and piston.

It is also noted that while the foregoing description of the pitch change control mechanism for the blades of the aft propeller assembly specified the use of a hydraulic-driven system, a pneumatic system could also be successfully employed if desired.

Wherefore, what is claimed is:

1. A twin engine, coaxial, dual-propeller propulsion system, comprising:

first and second engines;

a forward multi-bladed propeller assembly and an aft multi-bladed propeller assembly coaxial with the forward propeller assembly;

a transmission comprising,
   a first drive train comprising,
      a drive shaft connected at one end to an output of the first engine and at its other end to a hub of a pinion gear,
      an idler gear rotatable meshed with the pinion gear,
      an output gear rotatable meshed with the idler gear, and
      a propeller shaft connected at one end to the first propeller assembly and attached at the other end to a hub of the output gear, wherein
      the output of the first engine is capable of providing rotary torque when the first engine is running, thereby driving the pinion gear, which in turn drives the idler gear, which then drives the output gear and causes the propeller shaft to rotate, and a second drive train comprising,
  a drive shaft connected at one end to an output of the second engine and at its other end to a hub of a pinion gear,
  an output gear rotatable meshed with the pinion gear, and
  a housing attached coaxially at a first end to a hub of the output gear and at a second end to the second propeller assembly, said housing further having a cylindrical, longitudinal channel through which the propeller shaft associated with the first drive train extends without interference, wherein
  the output of the second engine is capable of providing rotary torque when the second engine is running, thereby driving the pinion gear, which in turn drives the output gear and causes the housing to rotate, and
  a non-rotating tubular support wherein the propeller shaft is supported by and rotates in the first rotational direction inside of the tubular support and the housing is supported by and rotates in the second rotation direction around the outside of the tubular support; and
at least one pitch change controller for controlling the pitch of the blades of the forward and aft propeller assemblies; wherein
the first engine exclusively drives the first drive train, which in turn exclusively rotates the forward propeller assembly and the second engine exclusively drives the second drive train, which in turn exclusively rotates the aft propeller assembly.

2. The propulsion system of claim 1, wherein the first drive train rotates the forward propeller assembly in a first rotational direction and the second drive train rotates the aft propeller assembly in a second rotational direction opposite of the first rotation direction.

3. The propulsion system of claim 1, wherein the at least one pitch change controller comprises:
  first and second pitch change controllers for controlling the pitch of the blades of the forward and aft propeller assemblies, said first pitch change controller capable of exclusively controlling the pitch of the blades of the forward propeller assembly, and said second pitch change controller capable of exclusively controlling the pitch of the blades of the aft propeller assembly.

4. The propulsion system of claim 3, wherein the first and second pitch change controllers are further capable of respectively controlling the pitch of the blades of their associated propeller assembly either while the associated propeller assembly is stationary or while it is rotating.

5. The propulsion system of claim 3, wherein the second pitch change controller comprises:
  an annular piston disposed in an annular cavity formed within the second drive train's housing, said piston being sized and configured such that it is pushed forward within the cavity when hydraulic pressure is applied to its aft face and the piston is pushed backward within the chamber when hydraulic pressure is applied to its front face;
  a hydraulic fluid feed circuit connected between the forward and aft end of the annular cavity, said feed circuit being capable of forcing hydraulic fluid into either the forward end or aft end of the annular cavity to respectively create hydraulic pressure on the front or aft face of the piston;
  a plurality of connecting rods extending from the front face of the annular piston, through a front wall of the housing, to a point between the forward and aft propeller assemblies;
  a collector ring connected to the distal end of each connecting rod; and
  a plurality of drive links, one for each blade of the aft propeller assembly, connected at a first end to the collector ring and at a second end to a point on the inner end of a corresponding propeller blade that is offset from the corresponding blade's center of rotation in its longitudinal direction; wherein
  the pitch of the blades of the aft propeller assembly is changed by using hydraulic pressure to move the annular piston, which in turn moves the connecting rods and collector ring, thereby also moving the drive links and longitudinally rotating the aft propeller assembly blades.

6. The propulsion system of claim 5, wherein forward movement of the annular piston causes the blades of the aft propeller assembly to rotate on their longitudinal axis in a first rotational direction and backward movement of the annular piston causes the blades of the aft propeller assembly to rotate on their longitudinal axis in a second rotational direction opposite the first, and wherein the length of the annular cavity, connecting rods and drive links is made such that the pitch of the blades can be changed from a full reverse thrust position to at least a full feathered position.

7. A transmission for a twin engine, coaxial, dual-propeller propulsion system having first and second engines, a forward multi-bladed propeller assembly, an aft multi-bladed propeller assembly coaxial with the forward propeller assembly and at least one pitch change controller for controlling the pitch of the blades of the forward and aft propeller assemblies, the transmission comprising:
  first and second drive trains wherein the first engine exclusively drives the first drive train, which in turn exclusively rotates the forward propeller assembly and the second engine exclusively drives the second drive train, which in turn exclusively rotates the aft propeller assembly, and wherein,
  the first drive train comprises,
    a drive shaft connected at one end to an output of the first engine and at its other end to a hub of a pinion gear,
    an idler gear rotatably meshed with the pinion gear,
    an output gear rotatably meshed with the idler gear, and
    a propeller shaft connected at one end to the first propeller assembly and attached at the other end to a hub of the output gear, wherein
    the output of the first engine is capable of providing rotary torque when the first engine is running, thereby driving the pinion gear, which in turn drives the idler gear, which then drives the output gear and causes the propeller shaft to rotate, and
  the second drive train comprises,
    a drive shaft connected at one end to an output of the second engine and at its other end to a hub of a pinion gear,
    an output gear rotatably meshed with the pinion gear, and
    a housing attached coaxially at a first end to a hub of the output gear and at a second end to the second propeller assembly, said housing further having a cylindrical, longitudinal channel through which the propeller shaft associated with the first drive train extends without interference, wherein the output of the second engine is capable of providing rotary torque when the second engine is running, thereby driving the pinion gear, which in turn drives the output gear and causes the housing to rotate; and wherein the transmission further comprises, a non-rotating tubular support wherein the propeller shaft is supported by and rotates in the first rotational direction inside of the tubular support and the housing is supported by and rotates in the second rotation direction around the outside of the tubular support.

8. The transmission of claim 7, wherein the first drive train rotates the forward propeller assembly in a first rotational direction and the second drive train rotates the aft propeller assembly in a second rotational direction opposite of the first rotation direction.

* * * * *